March 29, 1966   W. F. HINKLE   3,242,775
WRENCH FOR ENGAGING NUT FLATS TO INHIBIT MARRING THE NUT
Filed Aug. 11, 1965   2 Sheets-Sheet 1
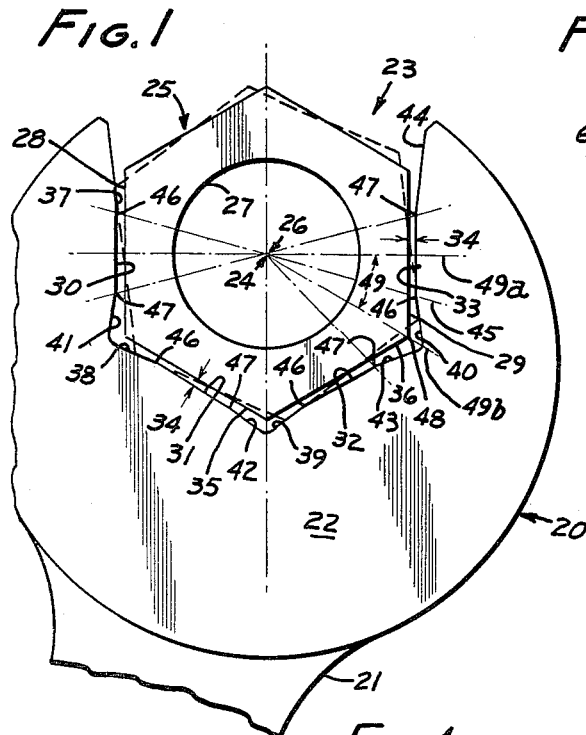
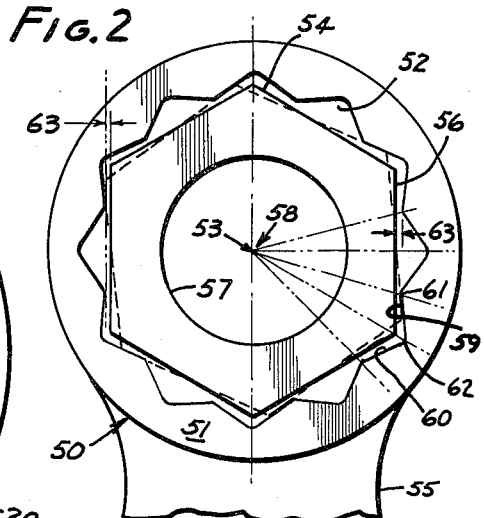
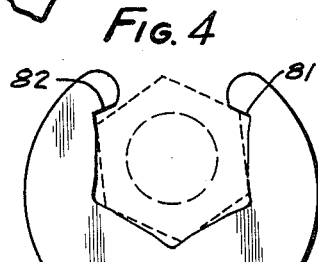
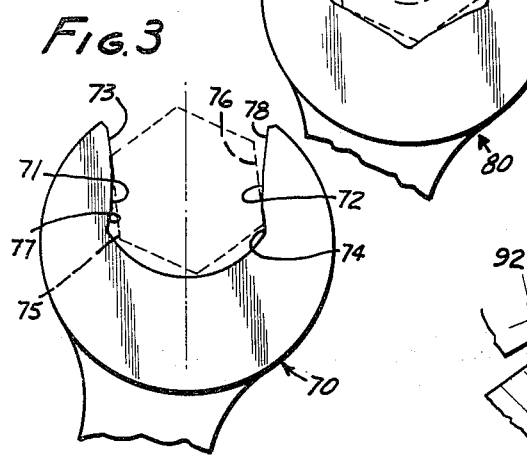
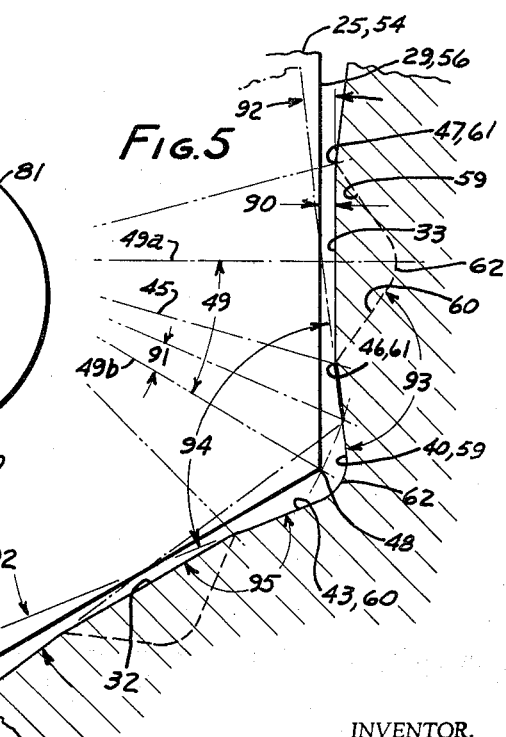
INVENTOR.
WALTER F. HINKLE
BY
ATTORNEYS.

March 29, 1966  W. F. HINKLE  3,242,775
WRENCH FOR ENGAGING NUT FLATS TO INHIBIT MARRING THE NUT
Filed Aug. 11, 1965  2 Sheets-Sheet 2

INVENTOR.
WALTER F. HINKLE
BY
*Aynes & Mou*
ATTORNEYS.

United States Patent Office 3,242,775
Patented Mar. 29, 1966

3,242,775
WRENCH FOR ENGAGING NUT FLATS TO
INHIBIT MARRING THE NUT
Walter F. Hinkle, 1245 Ethel St., Glendale, Calif.
Filed Aug. 11, 1965, Ser. No. 478,928
11 Claims. (Cl. 81—119)

This application is a continuation-in-part of applicant's co-pending patent application, Serial No. 449,554, filed April 20, 1965, entitled "Wrench," now abandoned.

This invention relates to wrenches for use in turning polygonal-shaped members such as nuts, bolts and the like.

For purposes of simplification and avoidance of repetition, the terms "nut" and "nut-engaging surfaces" will be used herein. These terms include, and generally refer to, hexagonal shaped members, but are not to be limited to hexagons alone nor to nuts alone but are intended to include other shapes such as square, and also structures such as the heads of screws, bolts and other threaded devices having a plurality of peripherally disposed diametrically opposite parallel pairs of flat surfaces used to rotate said devices by means of a suitable wrench.

Also, as used herein, the term "standard planar surfaces" refers to those surfaces in wrench nut-engaging cavities which are parallel to and duplicate, at least partially, the shape of the nut being engaged when the cavity and the nut are in symmetrical relationship to each other and their respective central axes are coincident.

Customarily, wrenches have nut-engaging cavities with a plurality of standard planar surfaces usually arranged in diametrically opposed parallel pairs and disposed in a shape duplicating and paralleling, at least in part, the shape of the nut to be engaged. Thus, the cavity in the common open-end wrench has two diametrically opposed standard planar parallel side-wall surfaces spaced apart sufficiently, in conformance with standard clearances, so as to fit over diametrically opposite parallel flat surfaces of the nut. Closed wrenches, such as box or socket types, have cavities containing a plurality of standard planar surfaces so arranged as to correspond exactly in shape to that of the appropriate nut, but with standard clearances so as to permit easy application thereon by the wrench. These latter wrenches may, but need not, also have a duplicate second cavity superimposed on the first cavity and rotatably disposed so as to have twice as many nut-engaging positions equally spaced around the boundary of the cavity. These are commonly known as 12-point wrenches, for hexagonal shapes, and 8-point wrenches, for square shapes.

Nut and wrench manufacturers have adopted standard dimensions and tolerances for these products which, taken together, establish not only the permissible maximum and minimum clearances between the wrench and the nut for each standard size, but also the resulting corresponding maximum and minimum angle of "free wrench swing" which can occur on each side of the symmetrical position before contact is made with the nut. Any wrench, to be readily acceptable to the trade, must adhere closely to these limitations. Obviously, the maximum permissible clearance and "free swing" will exist when a "maximum wrench" having the largest acceptable diametrical distance across the cavity is used with a "minimum nut" which has the smallest acceptable dimension diametrically across the flats, and conversely, the minimum permissible clearance and "free swing" will exist when a "minimum wrench" having the smallest acceptable distance diametrically across the cavity is used on a "maximum nut" which has the largest acceptable dimension diametrically across the flats.

Because of this necessary range of permissible clearances, it is obvious that, when the ordinary wrench is turned around its axis, contact is not made with any of the flat surfaces of the nut but is, instead, made solely on at least a pair of diametrically opposite corners of the nut. The pressure, under torque, is concentrated on very small, easily distorted areas which frequently results, especially at or near the maximum clearance, in mutilated and rounded-off corners. This also creates a potential accident hazard, should the wrench suddenly slip around the nut corners under torque. Further, because of the wedging action between the wrench surfaces and the nut corners, high spreading or bursting forces are built up in the head of the wrench which can crack or break the wrench, this being especially true with ordinary open-end wrenches.

It is an object of this invention to provide wrenches which apply torque to the flat faces of a nut instead of to the corners thereof, to eliminate rounding-off the corners and to reduce operational hazards.

It is a further object of this invention to provide wrenches having nut-engaging cavities with contours closely resembling those in customary, conventional wrenches in appearance so as to encourage ready customer acceptance and wherein all tolerances and clearances conform to accepted published manufacturer's standards.

It is still a further object of this invention to provide wrenches wherein all contacts of the wrench with the nut will be in areas of the flat faces of the nut closer to the corners thereof than to the middle of said flat faces (but not on the corners as in conventional wrenches) so as to obtain good leverage thereon and wherein the "free swing" or lost motion of the swing of the wrench each side of center before making contact, will be at a minimum, approximating that of conventional wrenches of comparable size.

It is still another object to provide wrenches wherein, when the maximum permissible clearance exists between the wrench and the nut, there are planar surfaces in the wrench cavity which are essentially in surface-to-surface contact with areas of corresponding flat surfaces on the nut near the nut corners, resulting in safe, mar-free operation instead of the hazardous and damaging situation which exists when using a conventional wrench bearing on the corners, under like maximum clearance conditions.

A still further object is to provide wrenches which are safer to use and less likely to crack or break under a given load, by reducing the wedging action and the resulting high spreading forces which are exerted, especially at or near maximum clearances, in the heads of common wrenches which work entirely on the corners of the nut.

It is another object of this invention to provide an open-end wrench wherein portions of the customary standard planar surfaces common to open-end wrench cavities are retained in the nut-engaging cavity and wherein, with the nut and the cavity in symmetrical relationship to each other and with their central axes coincident, the length of each of said portions is defined at each end by a line extending from the central axis of the nut and bisecting the angle formed by two lines, one of which extends from said axis and bisects the flat face of the nut closest to and paralleling said portion, and the other of which extends from said axis through the nut corner which terminates said flat nut face. The locations around the cavity boundaries of these terminal endings of said portions in an open-end wrench coincide radially with the locations of the apexes of intersecting planar surfaces in the cavities of box and socket wrenches usable on the same size and shape of nut, said coincidence of locations being a feature which permits a desirable amount of standardization of design and of production tooling when producing a so-called "family" of related styles of wrenches, containing advantages and objectives of this invention.

It is still another object to provide an open-end wrench wherein, when the wrench is turned around its central axis, planar surfaces in the nut-engaging cavity of the wrench are angulated relative to the flat surfaces of the nut at small angles of incidence approaching surface-to-surface contact, thus providing great resistance to objectionable indentation of the nut surfaces under load, and presenting a high ratio of length-to-depth of indentation, so as to minimize additional marring of the nut surfaces.

It is still another object of this invention to provide an open-end wrench in which the other objectives herein described are incorporated and which, while full lateral engagement of wrench and nut is always desirable, will still safely grip and turn a nut even though they are not fully engaged in the sense that their central axes do not coincide.

Other attempts have been made to provide wrenches which contact the nut on the flat surfaces instead of on the corners but none of these accomplish all of the desirable advantages of the instant invention. On the contrary, such previous efforts have usually produced some very undesirable results.

For example, some wrenches use a transverse axis of the nut, which bisects opposite flats, as a locating base for the nut-engaging portions of the wrench cavity, such portions either consisting of opposite pairs of flat surfaces angulated rather sharply away from respective nut flats in such a manner as to form an apex of each pair, said apexes being located on said transverse axis with the distance between said apexes being greater than the distance across the flats of the nut or else consisting, instead of said apexes, of curved surfaces having radii centered on said transverse axis. Such wrenches present an unacceptable, unorthodox contour in the wrench cavity, particularly in the open-end type, wherein all portions of the familiar and desirable standard planar parallel wall surfaces of the jaws have been eliminated. Further, and particularly at or near the minimum permissible clearance, the wrench contacts the nut too near the center of the flats and too far from the corners thereof, being in the order of only ⅙ of the distance from the center of the flat to the corner, at minimum clearance, thus undesirably reducing the leverage on the nut and inducing excessive indentation and marring of the nut surfaces by requiring greater torque due to the reduced leverage. Also, there is unnecessary and excessive "free swing" or lost motion in the wrench swing each side of center before making contact with the nut, this being, at minimum clearance, almost 6° and at maximum clearance, in excess of 15°. Further, when said apexes are used, the sharp angle at the point of the apexes results in excessive indentation and marring of the nut surfaces and this sharp angle, having only a small ratio of less than 10 to 1 of length-to-depth of indentation at minimum clearance, offers very little resistance to further indentation under increased torque. Also, in the open-end type, when said apexes are used, the wrench must always be in full, or almost full, contact with the nut laterally to avoid the danger of slipping off the corners and damaging same, particularly at or near the maximum permissible clearance. Finally, neither the apex nor the curved design is adaptable to an 8-point or a 12-point box or socket wrench. The present invention overcomes all of these undesirable faults while accomplishing all of its desirable objectives and advantages.

As a further example, some prior art wrenches use a series of rounded lobes or convolutions in the cavity spaced around the nut to contact the nut flats. Such wrenches also present an extremely unorthodox contour in the wrench cavity with no resemblance to the familiar and customary appearance of either open or closed wrenches. Further, the necessarily small radii of the lobes or convolutions readily cause objectionable indentations and marring on the nut flats under load and offer very little resistance to deeper indentation under increased load, the rounded shape having a rapidly decreasing ratio of length-to-depth of indentation as the depth of indentation increases. Also, such wrenches in the open-end style can be hazardous unless held in full, or almost full, lateral contact with the nut, by easily slipping off and around the nut corners, particularly at or near the maximum permissible clearance. Again, the present invention overcomes all of these undesirable faults while accomplishing all of its desirable objectives.

Open-end wrenches and tubing wrenches according to the present invention include improvements in the contours of the nut-engaging cavities wherein the familiar shapes of such cavities in conventional wrenches are changed only slightly, while maintaining the range of standard clearances between the wrench cavity and the nut, and wherein substantial portions of the standard planar surfaces which customarily partially bound such such nut-engaging cavities, are retained in areas extending each side of the middle of the respective paralleling flat surfaces of the nut when in symmetrical alignment therewith, and wherein said portions of the standard planar surfaces are joined at each end by angulated planar surfaces extending slightly away from the flat surfaces of the nut at about 6½°, each intersection of said standard and angulated planar surfaces forming the apex of a dihedral angle in the order of 173½°. These apexes and angulated planar surfaces are disposed opposite respective flat surfaces of the nut at locations nearer the corners than to the middle thereof so that, when the axes of the nut and the wrench cavity are coincident and the wrench is turned around its axis, the initial contacts with the nut, when the clearance between the wrench cavity and the nut is at or near the permissible minimum, will be by the apexes bearing against the flat surfaces of the nut near, but not at, the corners, with the standard planar surface portions of the cavity disposed at small angles of incidence in the order of 1° to 1½° to the nut surfaces and the angulated planar surfaces being at slightly larger angles of incidence in the order of 5½° to 5° thereto. These small angles of incidence of the standard and the angulated planar surfaces to the flat nut surfaces, which closely approach flat surface-to-surface contacts, offer a high degree of resistance to indentation of the nut surfaces under torque and, under these clearance conditions, have a high ratio of length-to-depth of indentation in the order of 60 to 1, which effectively resists further indentation under increased load, thus minimizing objectionable marring of the nut surfaces. As the permissible clearance betwen the wrench and the nut increases, the angles of incidence of the standard planar surfaces also increase while, at the same time, the angles of incidence of the angulated planar surfaces correspondingly decrease until, at the maximum permissible clearance, the standard planar surfaces no longer contact the nut surfaces and the angulated planar surfaces make flat surface-to-surface contacts with the nut surfaces in substantial areas near and adjacent to the nut corners. Thus, when the clearance is at the maximum and ordinary open-end and tubing wrenches are working under their worst conditions and tending to round-off the corners and spread the wrench jaws through a severe wedging action by working solely on the corners, open-end and tubing wrenches according to this invention have their best, safest and least damaging contact with the flats of the nut and effectively reduce the hazard of cracking or breaking the wrench. Furthermore, a tubing wrench according to this invention will have less tendency to crush or distort a thin-walled tubing nut by reducing the crushing force on the corners, thereby helping to insure a safe, non-leaking tubing joint.

Box and socket wrenches according to this invention also include improvements in the contours of the nut-engaging cavities wherein the familiar shapes of such cavities in conventional wrenches are changed only slightly, while maintaining the range of standard clearances between the wrench cavity and the nut, and wherein the standard planar surfaces bounding the wrench cavity, which ordinarily duplicate the shape of the nut and parallel the corresponding flat surfaces thereof while in symmetrical alignment therewith, are replaced by angulated planar surfaces corresponding to those in the open-end wrench and which extend away from the flat surfaces of the nut at about 6½° when in a symmetrical position relative thereto, each inwardly pointing intersection of these angulated planar surfaces in pairs forming the apex of a dihedral angle in the order of 137° instead of the customary 150°, and each outwardly pointing intersection of adjacent pairs of angulated planar surfaces forming an angle in the order of 107° instead of the customary 120°. This latter angle of 107° is the same as that formed in the tubing wrench, and in certain forms of the open-end wrench between adjacent angulated planar surfaces, which fact is important in the standardization of design and of production tooling in producing a "family" of related wrench styles. The said apexes and the angulated planar surfaces are arranged in the customary manner around the wrench cavity at equally spaced intervals and are disposed opposite respective flat surfaces of the nut at locations near the corners thereof so that, when the axes of the nut and the wrench cavity are coincident and the wrench turned around its axis, the initial contacts with the nut, when the clearance beween the wrench cavity and the nut is at or near the permissible minimum, will be by the apexes bearing against the flat surfaces of the nut near the corners, with the said angulated planar surfaces disposed at small angles of incidence in the order of 5° to 5½° to the nut surfaces, which is the same as in the open-end and tubing styles. These small angles of incidence, which closely approach flat surface-to-surface contacts, offer a high degree of resistance to indentation of the nut surfaces under torque, which retards further indentation under increased load, thus minimizing objectionable marring of the nut surfaces. As the permissible clearances between the wrench and the nut increase, the angles of incidence of the angulated planar surfaces decrease until, at the maximum permissible clearance, portions of said angulated planar surfaces are in flat surface-to-surface contact with substantial areas of the flat surfaces of the nut near and adjacent to the nut corners. Thus, when the clearance is at the maximum and ordinary wrenches are working under their worst conditions and tending to round-off the nut corners and possibly break the wrench by working solely on the corners, box and socket wrenches according to this invention have their best, safest and least damaging contacts with the flats of the nut and effectively reduce the danger of rounding-off the nut corners and the hazard of cracking or breaking the wrench or of crushing or distorting thin-walled nuts.

The above and other features of this invention will be fully understood from the following detailed description and the accompanying drawings, in which:

FIG. 1 is a plan view of the presently preferred embodiment of the invention in an open-end wrench, showing the wrench in solid line symmerically disposed relative to a nut with the central axes of each coincident, the nut being shown in dotted line to illustrate the driving position of the wrench relative to the nut;

FIG. 2 is a plan view similar to that of FIG. 1, showing a 12-point box or socket wrench instead of an open-end wrench;

FIG. 3 is a plan view similar to FIG. 1, showing another embodiment of the invention in an open-end wrench;

FIG. 4 is a plan view similar to FIG. 1, showing a tubing wrench according to the invention;

FIG. 5 is an enlarged superimposed plan view of one corner of a nut inside both an open-end wrench and a box wrench as shown in FIGS. 1 and 2, showing the similarity of contour in the cavities of both styles of wrenches in the areas around the nut corners;

Figure 6:
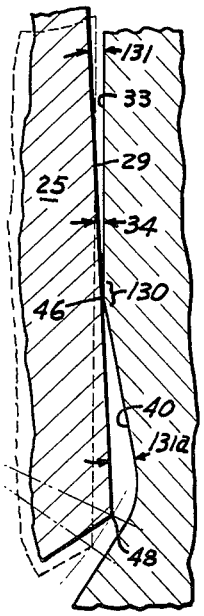
FIGS. 6–8 are plan views of one corner of a nut showing the relationship between the open-end wrench cavity contour and the nut of FIG. 1 with various clearances between them.

The presently preferred embodiment of an open-end wrench 20 according to the invention is shown in FIG. 1. This wrench includes a handle 21 and a jaw body 22. Within the jaw body, there is disposed an open-walled cavity 23 with a cavity central axis 24 which lies perpendicular to the plane of FIG. 1.

The wrench is intended to turn a nut 25 around a nut central axis 26 which is shown coincident with cavity central axis 24 in FIG .1. This nut is shown having a central axial threaded passage 27 for attachment to a stud or bolt. It will be understood that this nut is an example of numerous other types of fasteners that can be driven by the wrench, such as cap-screws, lag-screws and the like. The characterizing feature of objects for which the wrench is useful is that the object to be at least partially defined around its sides by at least two flat opposite bounding surfaces such as surfaces 28 and 29, which are parallel to the nut axis and to each other.

The nut is shown in two operative positions relative to the wrench, both of them with the axes coincident. In solid line, the nut is shown in a symmetrical position relative to the cavity, with the axes coincident. The other position is shown in dotted line with portions of the flat bounding surfaces of the nut in contact with portions of the wrench. For convenience in exposition, the nut has been shown rotated relative to the wrench. This is, of course, the same relative rotation that would occur in actual use where the wrench would be rotated relative to the nut to engage it.

In order to drive the nut, portions of the wrench cavity must contact it and exert torque forces thereon. In the preferred embodiment, there are provided within the wrench cavity, so that they partially bound the same, a plurality of standard planar surfaces 30–33, which are disposed the same as in an ordinary, conventional open-end wrench, especially the parallel surfaces 30 and 33. When the nut is in its symmetrical position as shown in solid line and the axes are coincident, then betwen parallel flat nut bounding surfaces and standard planar surfaces in pairs, there is a clearance 34. Examples of such clearances will be found between surfaces 28 and 30, 31 and 35, 32 and 36 and between 29 and 33. Each of the standard planar surfaces 30–33 extend a distance defined at each end by a line 45 extending from the central axis 26 of the nut and bisecting an angle 49 formed by a line 49a extending from said nut axis and bisecting the nut bounding surface 29 which is closest to and parallel to the respective standard planar surface 33 when the nut and the wrench cavity are in symmetrical relationship with their axes coincident, and another line 49b extending from said nut axis through the nut corner 48, which terminates said bounding surface.

The clockwise ends of the standard planar surfaces 30–33 join angulated planar surfaces 37–40 at apexes 46 and the counter-clockwise ends join angulated planar surfaces 41–44 at apexes 47. All angulated planar surfaces extend away from the nut bounding surfaces at angle 92 (see FIG. 5) in the order of 6½°, forming large outside dihedral angles 95 (see FIG. 5) with the standard planar surfaces in this instance, of the order of 173½° at apexes 46 and 47. The first set of angulated planar surfaces 37–40, together with apexes 46, are used in conjunction with standard planar surfaces 30–33 to turn the nut in a clockwise direction and the second set of angulated planar surfaces 41–44 are used in conjunction with apexes 47 and standard planar surfaces 30–33 to turn the nut in a counter-clockwise direction.

It will now be seen that when the wrench is turned around its central cavity axis relative to the nut so that the nut assumes the position shown in dotted line, there will be contact between the nut and either the apexes or the angulated planar surfaces of one set, as will later be discussed, and that this contact cannot occur on the corners of the nut, such as corner 48. Furthermore, it will be seen that the various apexes, such as 46, are so disposed and arranged that, when the dotted line position is reached by turning the nut counter-clockwise, as shown, the apexes 46 and the angulated planar surfaces 37–40 contact portions of the bounding surfaces of the nut which are near but not on the respective corners of the nut. This will also be true of apexes 47 and angulated planar surfaces 41–44 when the nut is turned in the opposite direction.

FIG. 2 shows an embodiment of the invention in a 12-point box or socket wrench 50 having a body 51 containing a cavity 52 having a central axis 53. This axis is perpendicular to the plane of FIG. 2. In solid line, nut 54 is shown in a symmetrical position relative to the cavity, and in dotted line, it is shown in engagement with the wrench cavity. In a box wrench, handle 55 is attached to said body. In this instance, the nut 54 is shown of hexagonal shape with six flat nut bounding surfaces 56 and having a central screw threaded hole 57 and a central axis 58, which is shown coincident with central cavity axis 53. The cavity 52 is bounded, in this instance, by a series of angulated planar surfaces 59 and 60 which intersect form apexes 61 with an included angle 93, shown in FIG. 5, in the order of 137° instead of the customary 150° of conventional box wrenches. Angulated planar surfaces 59 extend away from nut bounding surfaces 56, when the wrench and nut are symmetrically disposed, at angles 92, shown in FIG. 5, in the order of 6½° and angulated planar surfaces 60 bear the same relationship to their respective corresponding nut bounding surfaces. Angulated planar surfaces 59 and 60 form angles 94, shown in FIG. 5, in the order of 107°, instead of the customary 120°, in the nut corner clearance areas 62. Angle 94 is the same as that formed, for example, by angulated planar surfaces 40 and 43 in the open-end wrench shown in FIG. 1 and is an important factor in the standardization of design and of production tooling for a "family" of different wrench of related design. Clearances 63 between apexes 61 and nut surfaces 56 are the same as clearances 34 in FIG. 1 for like nut and wrench sizes. When the wrench is turned around its central axis in a clockwise direction, apexes 61 which, in this instance, are equally spaced 30° apart around the periphery of the cavity 52, in conjunction with angulated planar surfaces 59, contact nut bounding surfaces 56, near but not on, the nut corners at all clearance except at the maximum permissible clearance, at which time portions of angulated planar surfaces 59 are in full surface-to-surface contact with substantial areas of the nut surfaces 56, as shown in dotted line. When the wrench is rotated in a counter-clockwise direction, apexes 61 and angulated planar surfaces 60 function in a like manner on nut surfaces 56. Thus, at no time, is there any torque force applied directly on the nut corners, as with a conventional box or socket wrench, and therefore there is no tendency to round-off the corners.

FIG. 3 shows an open-end wrench 70 which contains only two parallel diametrically opposite standard planar surfaces 71 and 72 arranged as in a conventional open-end wrench with clearance like 34 in FIG. 1 and with a diagonally opposite pair of angulated planar surfaces 73 and 74 disposed relative to standard planar surfaces 71 and 72 identical with the relationship of angulated planar surfaces 37 and 40 to standard planar surfaces 30 and 33 in FIG. 1 for turning the nut in a clockwise direction by contacting nut bounding surfaces 75 and 76, and with another like pair of angulated planar surfaces 77 and 78 which function like surfaces 41 and 44 in FIG. 1 for turning the nut in a counter-clockwise direction by contacting the same nut surfaces 75 and 76. This embodiment, which applies torque on only two diametrically opposite surfaces of the nut instead of on four, as in FIG. 1, resembles a conventional open-end wrench so closely as to be almost indistinguishable therefrom, yet, as in all embodiments herein, torque is applied only to the flat nut surfaces near the corners to get the desired leverage and is never applied directly on the corners as with a conventional open-end wrench.

FIG. 4 shows an embodiment of the invention in a tubing wrench 80 which closely resembles the open-end wrench shown in FIG. 1 and which embodies the general shape and all of the advantages, clearances, angles and functions of same but with the addition of two more angulated planar surfaces 81 and 82, which have been added to provide drive in each direction on five surfaces of a hexagonal nut instead of four as in FIG. 1, thereby minimizing the load on each surface and providing torque further around the periphery of the nut and reducing the tendency to crush or distort a thin-walled tubing nut, which, in turn, could result in a leaky and possibily dangerous joint.

FIG. 5 is an enlarged plan view showing the relationship of one corner of nut 25 in FIG. 1, and nut 54 in FIG. 2 to the cavities in the respective open-end wrench 20 and box wrench 50, with maximum permissible clearance 90. This relationship will be the same in all embodiments of this invention. The similarities of the respective wrench cavities have been described above in the detailed descriptions of FIG. 1 and FIG. 2. When the maximum clearance 90 exists and with the length of the standard planar surface 33 limited at apex 46, as hereinbefore described, and which, in turn, coincides with apex 61, the nut 25 or 54 can be swung around its central axis from its symmetrical position as shown in full line, through angle 91, which is the same as angle 92 and is of the order of 6½°, until the nut surface 29 or 56 contacts apexes 46 or 61, as shown in dot-dash line. Thus, the angle 92, at which the angulated planar surfaces 40 or 59 is placed relative to the nut flat surfaces 29 or 56 and standard planar surface 33, is determined and defined by the amount of angular swing each side of symmetrical center available to the nut under maximum clearance conditions and results in a surface-to-surface contact between the angulated planar surfaces of the wrench cavity and the flat bounding surfaces of the nut. At clearances less than the permissible maximum, contact with the nut surfaces 29 or 56 is made by apexes 46 or 61 near, but not on, the corners of the nut and with the angulated planar surfaces 40 or 59 and standard planar surface 33 disposed at very small angles of incidence relative to the nut surface, which results in high resistance to indentation of the nut surface under load. The surfaces 59, 62 and 60, which are indicated by dotted line, indicate the contour in the box and socket wrenches which replaces the standard planar surface 33 in the open-end and tubing wrenches.

Figure 7:
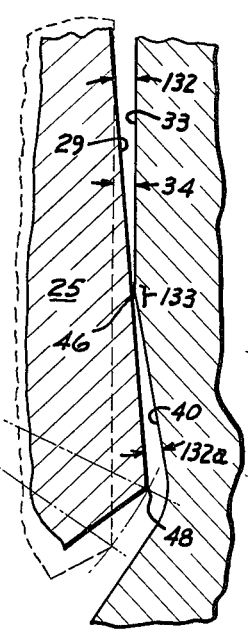
Figure 8:
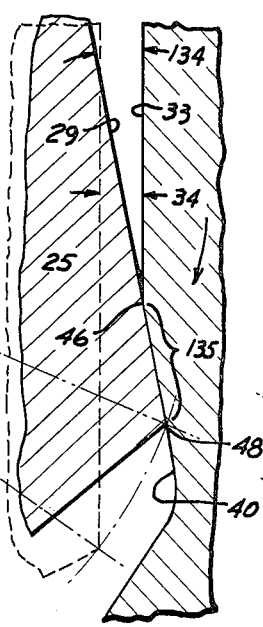

To aid in understanding the full scope of the improved design criteria of these wrenches, particularly the open-end style, FIGS. 6–8 show the relationship between the wrench and the nut shown in FIG. 1 under several progressively increasing permissible clearance conditions. In FIG. 6, the clearance 34 is at the minimum, representing the maximum nut and minimum wrench. FIG. 7 shows a medial clearance 34 such as exists with a medial nut and a medial wrench, and FIG. 8 shows the maximum clearance 34 between a minimum nut and a maximum wrench.

The nut 25 in all three figures is shown, relative to the construction of FIG. 1, in two positions, that of the dotted line representing, in these instances, the symmetrical arrangement of the wrench and nut with coincidental axes, and the solid line shows the wrench and nut in the driving position, the two having been turned around the coincidental axes relative to one another.

In FIG. 6, it will be seen that the contact region 130, where the apex 46 of the standard 33 and the angulated 40 planar surfaces in the wrench cavity touches the surfaces of the nut flat 29, is spaced well back away from corner 48 of the nut but it is still closer to the corner than to the middle of the nut flat, and that angle 131 between nut surface 29 and the standard planar surface 33 of the wrench is extremely small, being of the order of 1° to 1½°, and that angle 131a between nut surface 29 and angulated planar surface 40 is slightly larger than angle 131, being in the order of 5° to 5½°.

In FIG. 7, the contact region 133 is somewhat closer to corner 48 of the nut but is still amply removed therefrom, and angle 132 is now larger than angle 131 in FIG. 6, with angle 132a correspondingly smaller than 131a in FIG. 6. With this medial clearance 34 in FIG. 7, angles 132 and 132a are approximately equal, each being of the order of 3° to 3½°.

In FIG. 8, angle 134 has increased over angle 133 in FIG. 7 and has now reached its greatest magnitude, which, however, is still quite small, being of the order of 6½° and the contact region 135 now consists of a substantial surface-to-surface contact between portions of the angulated planar surface 40 and portions of the nut surface 29, and extending from the corner 48 along the flat face of the nut to apex 46 of the wrench cavity. This desirable flat surface-to-surface contact between the wrench and the nut at maximum clearance is a feature of all embodiments of this invention and provides safe, mar-free operation under the loosest and worst clearance conditions.

In these three FIGS. 6–8, angle 131, 132 and 134 also represent in each case, the angle of "free swing" or lost motion each side of the symmetrical center, through which the wrench must swing before contacting the nut, these angles, in each case, being so little greater than the "free swing" angles of a conventional wrench under like clearances, as to be hardly noticeable and certainly not objectionable.

Figure 9:
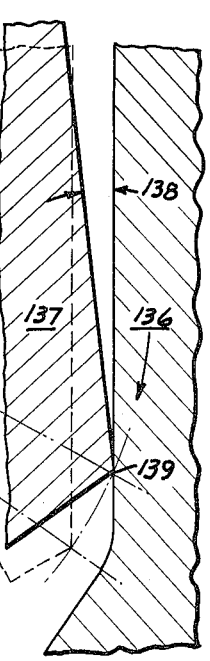
FIG. 9 is a plan view of one nut corner showing the relationship between the nut and a conventional wrench.

FIG. 9 shows how a conventional wrench 136 contacts the corner 139 of nut 137 at angle 138 and indicates the tendency for rounding off corner 139 and, at the same time, building up spreading forces in the head of the wrench due to the powerful wedging action at the nut corner, where there is a large stress concentration, under torque, on a very small, vulnerable area.

Figure 10:
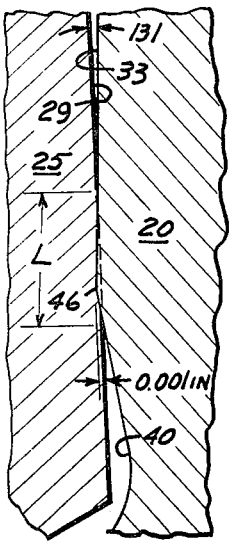
FIGS. 10–12 are fragmentary cross-sections corresponding basically to FIGS. 6–8, respectively, showing the resultant shape and length of the indentation in the nut-surface by the wrench for a specific depth of indentation.
Figure 11:
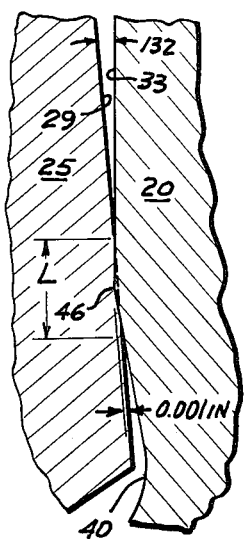
Figure 12:
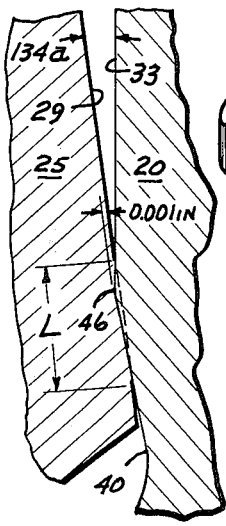

FIGS. 10–12 further illustrate the beneficial results attained through the use of the standard planar surfaces 33, wherever possible, as in the open-end and tubing wrenches, and of the angulated planar surfaces when disposed as in this invention for the various types of wrenches. FIGS. 10–12 are directly correlated with FIGS. 6–8, representing respectively minimum, median and immediately prior to maximum clearances 34. The purpose is to show the great length of surface area of contact between the wrench and the nut which has occurred by the time the wrench has idented the nut to a depth of only 0.001″. This is, of course, a very shallow indentation and it will be seen in FIG. 10, that the length L of the indentation is exceptionally large in relation to the small depth, having a constant ratio at that clearance of length-to-depth in the order of 60 to 1, with the greater portion of this length extending along standard planar surface 33, which emphasizes the desirability and benefits of retaining a substantial portion of these planar surfaces. By employing combinations of planar surfaces in the wrench cavity disposed in such a manner as to approach contact with the flat nut surfaces at very small angles of incidence close to surface-to-surface contact, the penetration into the nut surfaces of the apexes of the intersecting planar surfaces under torque, is resisted and minimized much more effectively than is possible through the use of curved contact surfaces or of larger angles of incidence. Further, the 60 to 1 ratio remains approximately constant as the depth increases, which is not true when using curved surfaces wherein the ratio decreases rapidly as the indentations increase in depth.

In FIG. 11, at median clearance, the length of indentation is distributed approximately equally along the standard and the angulated planar surfaces each side of apex 46. As the clearance increases, the length of the indentation increases along the angulated planar surfaces and decreases along the standard planar surfaces, as shown in FIG. 12, until, when the maximum clearance exists, portions of the angulated planar surfaces are in full surface-to-surface contact with substantial areas of the flat nut surfaces, as shown in FIG. 8.

The advantages of the foregoing wrench now may be readily understood. For one, the wrench will not round off the nut corners and slip around the nut, even under high torques, for the reason that the wrench is self-limiting in its effect. Further, the more the wrench indents under load, the greater is the rapid spread of the contact area and the less is the unit pressure loading, so that the point is quickly reached when the nut is able to sustain the load and distorting action will cease. Furthermore, this is effective even at the greatest clearance corresponding to the sloppiest fit, and this wrench actually is as safe with sloppy fits as it is with close fits, which is precisely the opposite of the results obtained with conventional wrenches. Furthermore, the contours of the wrench cavities resemble the contours of conventional wrenches so closely as to assure ready trade acceptance and are adaptable to the various styles of wrenches in common use.

Figure 13:
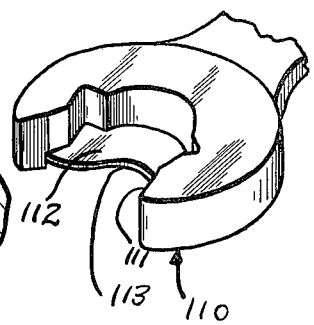
FIG. 13 is a fragmentary perspective view of another wrench incorporating the invention.

FIG. 13 shows a wrench 110 which has a cavity 111 that is intended to represent any of the cavities described herein. It includes an overhanging section 112 so disposed and arranged as to overhang and bear upon a nut that is to be tightened down. A recess 113 is formed to pass the bolt or stud (not shown) to which the nut is applied.

This invention is not to be limited by the embodiments shown in the drawings and described in the description which are given by way of example and not of limitation but only in accordance with the scope of the appended claims.

I claim:

1. A wrench for a wrench-nut system of the class wherein the nut has a central axis about to rotate and an even-numbered plurality of flat bounding surfaces parallel to said axis with diametrically opposite pairs parallel to each other, said bounding surfaces intersecting in adjacent pairs to form nut corners; said wrench comprising: a body containing a nut-engaging cavity having a central axis adapted to be placed coincident with said nut axis about which to rotate, a plurality of planar surfaces at least partially bounding the cavity, and being parallel to said axis and so arranged and disposed relative to each other as to intersect, in pairs, at at least one pair of diametrically opposite locations, so as to form apexes of dihedral angles, said apexes being disposed inwardly toward said cavity, each of said locations being opposite and spaced away from a portion of a bounding surface when said nut and cavity are disposed in symmetrical relationship to each other, with at least one of said intersecting planar surfaces angulated outwardly away from the plane of said bounding surface, said portion being spaced away from the middle of said bounding surface by a distance defined by a line extending from said central coincidental axes and forming an angle with an other line extending through said axes and bisecting said bounding surface, the magnitude of said angle being such that there are four times as many such angles, all of equal magnitude, possible in a complete circle inscribed within said cavity around said axes, as there are bounding surfaces on said nut, the outer ends of adjacent planar surfaces away from said apexes being joined to form clearance areas for said nut corners, said apexes contacting said bounding surfaces, when said cavity is rotated around said coincident axes, in areas of said bounding surfaces near, but not on, the corners of said nut.

2. A wrench according to claim 1 in which the clearance spacing between said locations and said bounding surfaces is derived from tolerances permitted in the manufacture of the wrench and nut, the range of magnitudes of said spacing starting at that minimum spacing which occurs when a minimum cavity and a maximum nut are combined, and ending with that maximum spacing which occurs when a maximum cavity and a minimum nut are combined.

3. A wrench according to claim 1 in which at least one of each pair of said intersecting planar surfaces is angulated outwardly away from the plane of said bounding surface at an angle on the order of about 6½°.

4. A wrench according to claim 1 in which when the wrench and nut are mutually rotated so that the wrench contacts said bounding surfaces, at least one surface of each pair of said intersecting planar surfaces is disposed angularly relative to said bounding surface at an angle of incidence ranging downward from the order of 5° to 5½° at the minimum permissible clearance spacing between said apex and said bounding surface, to zero degrees representing a surface to surface contact between a portion of said planar surface and a portion of said bounding surface near, but not solely on, said nut corner when the maximum permissible clearance spacing exists, thus presenting, at all clearances, cavity surfaces which, at contact with the nut, are resistant to indenting said bounding surfaces under torque load.

5. A wrench according to claim 1 in which said outer ends of said adjacent planar surfaces are joined at an angle in the order of 107° to form said clearance areas for said nut corners.

6. A wrench for a wrench-nut system of the class wherein the nut has a central axis about which to rotate and an even-numbered plurality of flat bounding surfaces parallel to said axis with diametrically opposite pairs parallel to each other, said bounding surfaces intersecting in adjacent pairs to form nut corners, said wrench comprising: a body; a handle attached to said body; said body containing an open-walled nut-engaging cavity having a central axis, coincident with said nut axis, about which to rotate; said cavity being at least partially bounded by a plurality of standard planar surfaces and angulated planar surfaces, all of which are parallel to said cavity axis, said standard planar surfaces, including at least one diametrically opposite parallel pair, duplicating at least in part, the peripheral shape of said nut and paralleling adjacent bounding surfaces, and spaced away therefrom when said nut and cavity are in symmetrical relationship to each other, the length of each of said standard planar surfaces being defined equally each side of the middle of its paralleling bounding surface by a line extending from said central coincidental axes and forming an angle with another line extending through said axes and bisecting said paralleling bounding surface, the magnitude of said angle being such that there are four times as many angles, all of equal magnitude, possible in a complete circle inscribed within said cavity around said axes, as there are bounding surfaces on said nut; said angulated planar surfaces being so arranged and disposed outwardly relative to the planes of said bounding surfaces and of said standard planar surfaces as to intersect said standard planar surfaces at each end thereof at diametrically opposite locations at least partially around said cavity thereby to form apexes of outwardly disposed dihedral angles, said apexes being disposed inwardly toward said cavity, each of said locations being radially opposite a portion of a bounding surface, said portion being spaced away from the middle of said bounding surface by a distance defined by the same line and angle used to define the length of said standard planar surface, and the outer ends of adjacent angulated planar surfaces away from said apexes being joined to form clearance areas for said nut corners; said apexes contacting said bounding surfaces, when said cavity is rotated around said coincidental axes, in areas of said bounding surfaces near, but not on, said corners.

7. An open-end wrench according to claim 6 in which the clearance spacing between said standard planar surfaces and said bounding surfaces is derived from tolerances permitted in the manufacture of the wrench and nut, the range of magnitudes of said spacing starting at that minimum spacing which occurs when a minimum cavity and a maximum nut are combined, and ending with that maximum spacing which occurs when a maximum cavity and a minimum nut are combined.

8. An open-end wrench according to claim 6 in which said angulated planar surfaces are disposed outwardly from said cavity at an angle on the order of 6½° relative to the planes of said bounding surfaces and of said standard planar surfaces.

9. An open-end wrench according to claim 6 in which the said outwardly disposed dihedral angles formed at the apexes by the intersection of said standard planar surfaces and said angulated planar surfaces are in the order of 173½°.

10. An open-end wrench according to claim 6 in which when the wrench and nut are mutually rotated so that the wrench contacts said bounding surfaces, said standard planar surfaces and said angulated planar surfaces are disposed relative to said bounding surfaces at angles of incidence in the order of 1° to 1½° and 5° to 5½°, respectively, when the minimum permissible clearance spacing exists between said standard planar surfaces and said bounding surfaces with said cavity and nut disposed in symmetrical relationship to each other with their central axes coincident, said angles of incidence of said standard planar surfaces increasing and those of said angulated planar surfaces decreasing as the clearance spacing increases, to become in the order of 6½° and zero degrees, respectively, which latter represents surface-to-surface contact between portions of each of said angulated planar surfaces and said bounding surfaces when the maximum permissible clearance spacing exists, thus presenting, at all clearances, cavity surfaces which, at contact with the nut, are resistant to indenting said bounding surfaces under torque load.

11. An open-end wrench according to claim 10 in which said outer ends of adjacent angulated planar surfaces are joined at an angle in the order of 107° to form said clearance areas for said nut corners.

References Cited by the Examiner

UNITED STATES PATENTS

| 2,358,555 | 9/1944 | Blanchard | 81—119 X |
| 2,697,371 | 12/1954 | Bowman | 81—119 |
| 3,125,910 | 3/1964 | Kavalar | 81—121 |

MILTON C. MEHR, *Examiner*.

FOREIGN PATENTS

| 770,360 | 6/1934 | France. |
| 879,917 | 12/1942 | France. |

WILLIAM FELDMAN, *Primary Examiner*.